United States Patent
Ren et al.

(10) Patent No.: US 11,403,021 B2
(45) Date of Patent: Aug. 2, 2022

(54) FILE MERGING METHOD AND CONTROLLER

(71) Applicant: Huawei Technologies Co., Ltd., Shenzhen (CN)

(72) Inventors: Bo Ren, Chengdu (CN); Feiteng Huang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 479 days.

(21) Appl. No.: 16/579,349

(22) Filed: Sep. 23, 2019

(65) Prior Publication Data

US 2020/0019331 A1 Jan. 16, 2020

Related U.S. Application Data

(63) Continuation of application No. PCT/CN2018/071929, filed on Jan. 9, 2018.

(30) Foreign Application Priority Data

Mar. 22, 2017 (CN) .......................... 201710175180.0

(51) Int. Cl.
 *G06F 3/06* (2006.01)
 *G06F 16/22* (2019.01)

(52) U.S. Cl.
 CPC ........... *G06F 3/0643* (2013.01); *G06F 3/067* (2013.01); *G06F 3/0622* (2013.01); *G06F 3/0658* (2013.01); *G06F 3/0679* (2013.01); *G06F 16/2246* (2019.01)

(58) Field of Classification Search
 CPC .......................... G06F 3/0643; G06F 16/2246
 See application file for complete search history.

(56) References Cited

U.S. PATENT DOCUMENTS

| 7,873,607 | B1 * | 1/2011 | Knutson | ............... G06F 16/217 707/694 |
| 9,324,367 | B1 * | 4/2016 | Ku | .......................... G11B 5/012 |
| 2003/0046280 | A1 * | 3/2003 | Rotter | .................... G06F 16/215 |
| 2007/0128899 | A1 * | 6/2007 | Mayer | .................... G06F 9/4406 439/152 |

(Continued)

FOREIGN PATENT DOCUMENTS

| CN | 103186350 A | 7/2013 |
| CN | 103593436 A | 2/2014 |

(Continued)

OTHER PUBLICATIONS

Fei, M., "SSDKV:a fast key-value system based on SSD devices",Computer Engineering and Science, vol. 38, No. 7, Jul. 2016, 10 pages.

(Continued)

*Primary Examiner* — Eliyah S. Harper
(74) *Attorney, Agent, or Firm* — Conley Rose, P.C.

(57) ABSTRACT

A file merging method performed by a controller in a storage system includes reading a first file and a second file on a solid state disk, determining whether a key of the first data is the same as a key of the second data, creating a third file on a mechanical hard disk when the key of the first data is the same as the key of the second data, merging the first data and the second data, and writing the merged data into the third file.

20 Claims, 3 Drawing Sheets

(56) References Cited

U.S. PATENT DOCUMENTS

| | | | | |
|---|---|---|---|---|
| 2008/0177994 | A1* | 7/2008 | Mayer | G06F 16/00 709/224 |
| 2010/0037206 | A1* | 2/2010 | Larimore | G06F 16/188 718/1 |
| 2010/0235831 | A1* | 9/2010 | Dittmer | G06F 9/45558 718/1 |
| 2011/0270855 | A1* | 11/2011 | Antonysamy | G06F 16/1794 707/756 |
| 2014/0089258 | A1* | 3/2014 | She | G06F 16/328 707/609 |
| 2016/0170838 | A1* | 6/2016 | Erickson | G06F 11/1469 711/162 |
| 2016/0350302 | A1* | 12/2016 | Lakshman | G06F 16/9014 |
| 2017/0193041 | A1* | 7/2017 | Fuchs | G06F 16/21 |
| 2018/0150472 | A1 | 5/2018 | Chen et al. | |

FOREIGN PATENT DOCUMENTS

| | | | |
|---|---|---|---|
| CN | 103744628 | A | 4/2014 |
| CN | 103812877 | A | 5/2014 |
| CN | 103838681 | A | 6/2014 |
| CN | 104809237 | A | 7/2015 |
| CN | 105447059 | A | 3/2016 |
| CN | 106156070 | A | 11/2016 |
| WO | 2013025864 | A1 | 2/2013 |
| WO | 2017020576 | A1 | 2/2017 |

OTHER PUBLICATIONS

Machine Translation and Abstract of Chinese Publication No. CN103186350, Jul. 3, 2013, 19 pages.
Machine Translation and Abstract of Chinese Publication No. CN103838681, Jun. 4, 2014, 16 pages.
Machine Translation and Abstract of Chinese Publication No. CN104809237, Jul. 29, 2015, 22 pages.
Machine Translation and Abstract of Chinese Publication No. CN105447059, Mar. 30, 2016, 33 pages.
Foreign Communication From A Counterpart Application, PCT Application No. PCT/CN2018/071929, English Translation of International Search Report dated Apr. 12, 2018, 2 pages.
Foreign Communication From A Counterpart Application, PCT Application No. PCT/CN2018/071929, English Translation of Written Opinion dated Apr. 12, 2018, 4 pages.

* cited by examiner

FILE MERGING METHOD AND CONTROLLER

CROSS-REFERENCE TO RELATED APPLICATION

This application is a Continuation Application of International Patent Application No. PCT/CN2018/071929 filed on Jan. 9, 2018, which claims priority to Chinese Patent Application No. 201710175180.0 filed on Mar. 22, 2017. Both of the aforementioned applications are hereby incorporated by reference in their entireties.

TECHNICAL FIELD

Embodiments of the present disclosure relate to the field of storage technologies, and in particular, to a file merging method and a controller.

BACKGROUND

A log-structured merge-tree (LSM-tree) is a data structure relative to a B+ tree, and is mainly intended to resolve a problem of low performance caused by a lot of random input/output (I/O) of the B+ tree. Essentially, a balance is achieved between read and write, and read performance is sacrificed to improve write performance to a large extent.

There are many key-value (also referred to as KV) storage engines in the industry that are implemented based on an LSM-tree principle. These storage engines are widely applied to various data storage systems. A core idea of implementing a KV storage engine in all these applications is that random I/O is converted into sequential I/O writing, then data is collated by a memory to be a locally ordered file and stored in a file system, and finally, files in a plurality of file systems are merged and sorted to improve read performance. However, how to improve efficiency of data reading in these files is a problem that currently needs to be resolved.

SUMMARY

A first aspect of the present disclosure provides a file merging method. The method is applied to a storage system. The storage system includes a controller, a solid state disk (also referred to as SSD), and a mechanical hard disk. The controller reads a first file and a second file on the solid state disk. The first file stores first data and a key of the first data, and the second file stores second data and a key of the second data. The controller determines whether the key of the first data is the same as the key of the second data. The controller creates a third file on the mechanical hard disk when the key of the first data is the same as the key of the second data. Then the controller merges the first data and the second data, and writes the merged data into the third file.

According to the file merging method provided in the first aspect of the present disclosure, a file before merging is stored in the solid state disk, and a file after merging is stored in the mechanical hard disk. Data in the file before merging is new data, and therefore is more likely to be read. Data reading efficiency can be improved by storing the file before merging in the solid state disk. Data in the file after merging is old data, and therefore is less likely to be read. Costs can be reduced by storing the file after merging in the mechanical hard disk.

In the first aspect, the file after merging, namely, the third file, may alternatively be stored in the solid state disk. In this case, although the costs cannot be reduced, the data reading efficiency can be further improved.

Based on the first aspect, in a first implementation of the first aspect, a cache of the controller stores at least two immutable memtables and one memtable, the first data is data from one of the at least two immutable memtables, the second data is data from another of the at least two immutable memtables, and the memtable is used to receive data sent by a host.

Based on the first aspect, in a second implementation of the first aspect, the controller monitors whether a quantity of files on the solid state disk reaches a preset threshold, and the controller reads the first file and the second file on the solid state disk when the quantity of files on the solid state disk reaches the preset threshold. Herein, a trigger condition is set for file merging. To be specific, when the quantity of files on the solid state disk reaches the preset threshold, file merging starts to be performed. As for how to select to-be-merged files, all files on the solid state disk may be used as the to-be-merged files, or the to-be-merged files may be specified by a user, or another manner may be used.

Based on the first aspect, in a third implementation of the first aspect, the storage system further includes a storage class memory, and the storage class memory further stores a log file. The controller receives a first data writing instruction sent by a host, and writes the first data writing instruction into the log file. The first data writing instruction includes the first data and the key of the first data. The controller receives a second data writing instruction sent by the host, and writes the second data writing instruction into the log file. The second data writing instruction includes the second data and the key of the second data. The controller plays back the log file to obtain the first data, the key of the first data, the second data, and the key of the second data. The controller creates the first file on the solid state disk, and writes the first data and the key of the first data into the first file, and creates the second file on the solid state disk, and writes the second data and the key of the second data into the second file. Because the storage class memory is a new-type storage medium with relatively high read and write efficiency, storing the log file in the storage class memory and playing back the log file to obtain the data achieve higher efficiency.

With reference to the third implementation of the first aspect, in a fourth implementation of the first aspect, the first data writing instruction is written into the log file through appending. The appending manner can improve log file writing efficiency.

With reference to the third or fourth implementation of the first aspect, in a fifth implementation of the first aspect, the log file further includes an additional data writing instruction, and the method further includes sorting, by the controller, all data writing instructions in the log file based on a key included in each data writing instruction. After file data is generated by playing back the sorted log file, keys of the data are also sorted in ascending order or descending order, facilitating search.

A second aspect of the present disclosure provides a controller. The controller is located in a storage system. The storage system includes the controller, a solid state disk, and a mechanical hard disk. The controller includes a communications interface and a processor. The communications interface is configured to communicate with the solid state disk and the mechanical hard disk. The processor is configured to perform the method in any implementation of the first aspect.

BRIEF DESCRIPTION OF DRAWINGS

To describe technical solutions in some embodiments of the present disclosure more clearly, the following briefly describes accompanying drawings describing some of the embodiments.

DESCRIPTION OF EMBODIMENTS

The technical solutions in the embodiments of the present disclosure are clearly described below with reference to the accompanying drawings.

Data storage in a KV storage system is implemented using a structure of an LSM-Tree. Based on the LSM-Tree, random writing is converted into sequential writing to increase a data writing speed. In an embodiment of the present disclosure, the LSM-Tree is applied to a storage system including a solid state disk. The storage system described in this embodiment is described below with reference to FIG. 1 and FIG. 2.

Figure 1:
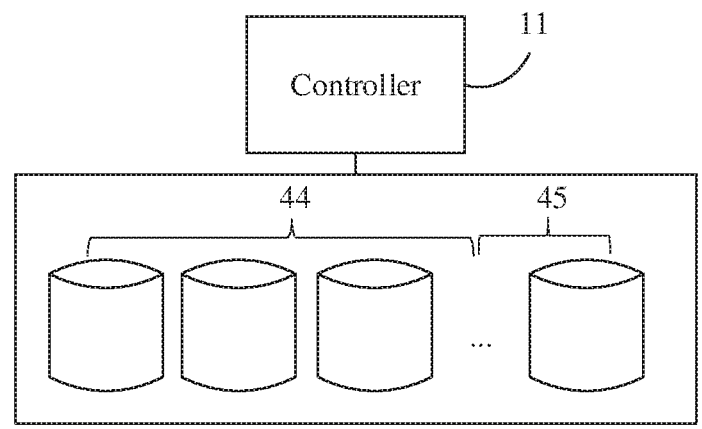
FIG. 1 is a composition diagram of a storage system according to an embodiment of the present disclosure.

As shown in FIG. 1, the storage system includes at least one controller 11, at least one solid state disk 44, and at least one mechanical hard disk 45.

The controller 11 is connected to a host (not shown in the figure) using a storage area network (SAN). The controller 11 may be a computing device, for example, a server or a desktop computer. A writing system and an application program are installed on the controller 11. The controller 11 may receive an I/O request from the host. The controller 11 may further store data included in the I/O request, and write the data into the solid state disk 44. The controller 11 is a system controller, and the system controller is an independent device different from a control chip in the solid state disk 44. In this embodiment, the control chip of the solid state disk 44 is referred to as a solid state disk controller. Unless otherwise specified, the controller 11 in this embodiment is the system controller.

The solid state disk 44 is a memory using a flash memory chip as a storage medium, and is also referred to as a solid state drive.

Figure 2:
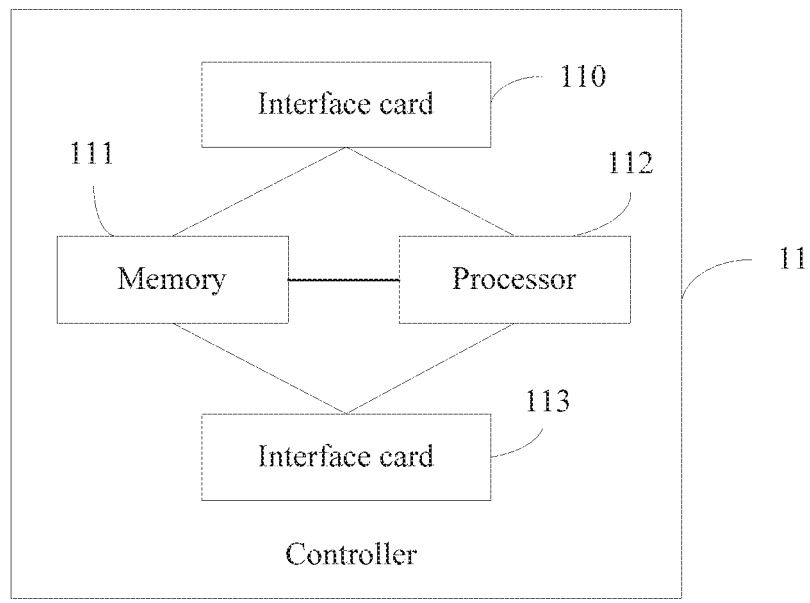
FIG. 2 is a schematic structural diagram of a controller according to an embodiment of the present disclosure.

FIG. 2 is a schematic structural diagram of the controller 11. As shown in FIG. 2, the controller 11 includes an interface card 110, a processor 112, a memory 111, and an interface card 113.

The interface card 110 is configured to communicate with the host. The controller 11 may receive a data writing instruction from the host through the interface card 110. For example, the data writing instruction includes a key and a value. The value is data to be written into the storage system (referred to as data in the following). The key is an identifier of the value. In a specific example, the value may be various information about a student, and the key may be a student number of the student, or another identifier that indicates an attribute of the student in a specific aspect.

The interface card 113 is configured to communicate with the solid state disk 44. The controller 11 may send, using the interface card 113, a data writing request (including the key and the data in the above described data writing instruction, and a logical address allocated by the controller 11 to the data) to the solid state disk 44 for storage.

The processor 112 may be a central processing unit (CPU). In this embodiment of the present disclosure, the processor 112 may be configured to receive data writing instructions or reading instructions from the host and process these instructions. The processor 112 may further send the data in the data writing instruction to the solid state disk 44. In addition, the processor 112 may be further configured to perform a file merging operation when a specific condition is met. The memory 111 includes a volatile memory, a non-volatile memory, or a combination thereof. The volatile memory is, for example, a random access memory (RAM). The non-volatile memory is, for example, various machine-readable media that can store program code, such as a FLOPPY DISK, a hard disk, a solid state disk, and an optical disc. The memory 111 has a power-failure protection function. The power-failure protection function means that data stored in the memory 111 is not lost even when a system is suffered from a power failure. There may be one or more memories 111 configured to temporarily store data received from the host or data read from the solid state disk 44. For example, when the controller 11 receives a plurality of data writing requests sent by the host, data in the plurality of data writing requests may be temporarily stored in the memory 111. In addition, the memory 111 further stores a memtable and an immutable memtable. According to an LSM-Tree mechanism, the memtable is used to receive a data writing instruction that is sent by the host in a period of time. For example, the data writing instruction stored in the memtable may be shown in Table 1.

TABLE 1

| Key | Value | Version |
|------|-------|---------|
| 0001 | Tom   | 2017.3  |
| 0003 | Dick  | 2017.3  |
| ...  | ...   | ...     |
| 0002 | Harry | 2017.3  |

As shown in Table 1, the memtable stores a plurality of groups of data. Each group of data includes a key, a value, and version information. The key and the value are described above, and are not described herein again. The version information is time information of data writing, or other information for identifying a sequence of data writing. It may be understood that, in this embodiment, the version information may be precise to month, or may be precise to day, hour, minute, or second. A form and precision of the version information are not limited in this embodiment. In addition, all data written in this period of time is stored in the memtable. The version information is allocated by the controller 11 to the data writing instruction when the controller 11 receives the data writing instruction.

According to the LSM-Tree mechanism, when a data amount of all data stored in the memtable reaches a preset threshold, the memtable is converted into an immutable memtable. The immutable memtable does not receive new data any more. In addition, the memory 111 further creates a new memTable for receiving data. Therefore, the memory 111 may store one or more immutable memtables, but only one memtable. Data in each immutable memtable is fixed, whereas the memtable may continuously receive newly written data. The data in the immutable memtable needs to be sorted in ascending or descending order of keys, as shown in Table 2.

TABLE 2

| Key  | Value | Version |
|------|-------|---------|
| 0001 | Tom   | 2017.3  |
| 0001 | Tom   | 2017.4  |
| 0002 | Harry | 2017.3  |
| 0002 | Harry | 2017.4  |
| ...  | ...   | ...     |
| 0003 | Dick  | 2017.3  |

In the LSM-Tree mechanism, data in each immutable memtable is dumped in a sorted string table (SST) file (referred to as a file in the following). It may be understood that, the storage system includes a plurality of files. Each file corresponds to one immutable memtable, and is used to receive data dumped from the immutable memtable. In this embodiment, a file directly generated due to dumping of an immutable memtable (namely, a file that is not merged) is used as a file at a first layer.

Figure 3:
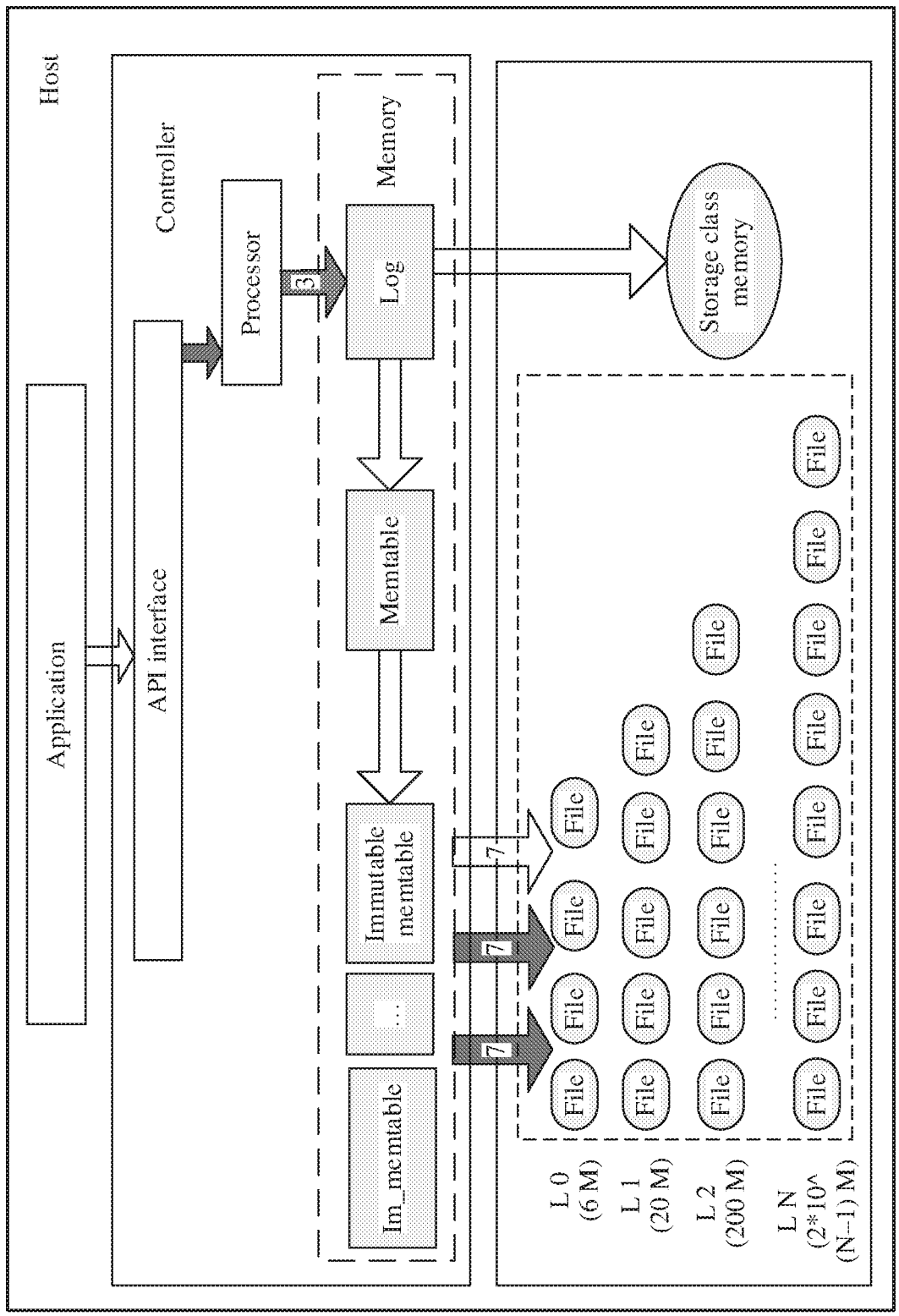
FIG. 3 is a structural diagram of data organized by a controller according to an embodiment of the present disclosure.

In this embodiment, the controller 11 includes a file system. Therefore, data may be organized in a form of a file. A structure of data organized by the controller 11 is shown in FIG. 3. As shown in FIG. 3, key-value data is stored in an erase block of the solid state disk 44. An actual storage address of the data in the erase block is a physical address of the data. The controller 11 maps one or more erase blocks to one logical space. For example, the logical space may be a logical unit (LU). The controller 11 and the solid state disk 44 both store a logical address of the data and a correspondence between the logical address and the physical address. The logical address of the data is an identifier (ID) (for example, an LU ID) of a logical unit in which the data is located, a start location (for example, a logical block address) of the data in the logical unit, and a length. In addition, because the controller 11 further has the file system above the logical space, a user may access data in a form of a file. The controller 11 further stores a correspondence between the logical address and an identifier of a file, and a correspondence between the physical address and the identifier of the file.

It can be learned from the foregoing description that, each immutable memtable includes data with different keys, and correspondingly, a file corresponding to the immutable memtable also stores the data with the different keys. That is, data corresponding to a same key is distributed in different files. Therefore, when receiving a reading instruction for requesting to read data, the solid state disk 44 needs to obtain, from different files based on a key included in the reading instruction, various data corresponding to the key, determine latest data based on version information, and return the latest data to the user. Such a process affects data reading efficiency. Therefore, it is necessary to merge files. The merging is intended to merge data with a same key in different files such that after the merging, the same key corresponds to only one piece of data or a few pieces of data (this is set based on a system setting or a user requirement).

Further, when a total quantity of files at the first layer reaches a specific threshold, files at the first layer need to be merged. A manner of merging the files may be merging all the files at the first layer, or may be merging some files at the first layer, or to-be-merged files at the first layer may be specified by the user. A new file generated after the merging is a file at a second layer. By analogy, when a total quantity of files at the second layer reaches a specific threshold, files at the second layer may be further merged to establish a file at a third layer. File merging can reduce duplicate data or invalid data, and improve data reading efficiency. For example, in a period of time, data in a key range [1, 10] is written into a file 1, data in a key range [5, 20] in a file 4 is updated, and some data in a key range [10, 20] is deleted from a file 7.

In addition, in the SST file, each piece of data is stored in a key-value format. Each piece of data in the file is identified using a key in the key-value. All keys stored in each file are sorted orderly. A key range of each file is identified using a combination of a start key and an end key.

Generally, data in a file at the first layer is more likely to be read because the data is newly received data, whereas data in a file at another layer is old data, and is less likely to be read. Therefore, in this embodiment, the file at the first layer is deployed in the solid state disk, and a file at another layer other than the first layer is deployed in the mechanical hard disk. Because the solid state disk has higher data read and write efficiency than the mechanical hard disk, such file deployment can further improve the data reading efficiency.

In addition, the storage system shown in FIG. 1 may further include a storage class memory (SCM) (not shown) configured to store a log file. After receiving the data writing instruction, the controller 11 first writes information included in the data writing instruction into the log file, and then writes the data writing instruction into the memtable. As described above, data in an immutable memtable is dumped in the solid state disk 44 to generate an SST file. In addition, this embodiment further provides another data storage manner. That is, an SST file is generated directly based on a record in the log file. Further, after receiving a plurality of data writing instructions sent by the host, the controller 11 writes each data writing instruction into the log file through appending. Therefore, the log file stores the plurality of data writing instructions, and each data writing instruction includes a key. Sorting is performed on the log file based on the key of each data writing instruction. In addition, the log file further includes control information, for example, information such as an operation type or a global sequence number. The information is used to generate data and a key of the data after the log file is played back, and ensure a playback sequence and operation reliability. The operation type is used to indicate an operation such as a data writing instruction or a deletion instruction. The global sequence number may be a log sequence number (LSN).

In addition, the storage system further stores one or more management files (not shown in FIG. 3), used to record a layer at which each file is located, a maximum key and a minimum key of a single file, an identifier of each file, a range of a key included in each file, and other metadata information. The other metadata information includes but is not limited to an actual address of data in the solid state disk 44, a logical address of the data, a writing record of writing the data, a correspondence between the actual address and an identifier of a file to which the data belongs, and the like. The logical address of the data may be the identifier of the file to which the data belongs, or may be a combination of the identifier of the file to which the data belongs and an offset location of the data in the file, or may be a combination of the identifier of the file to which the data belongs, an offset location of the data in the file, and a length of the data. The writing record includes how and when a user writes the data, and time at which the data is written using version information. The management file may be stored in the solid state disk 44, or may be stored in the mechanical hard disk 45, or may be stored in the storage class memory 46.

Figure 4:
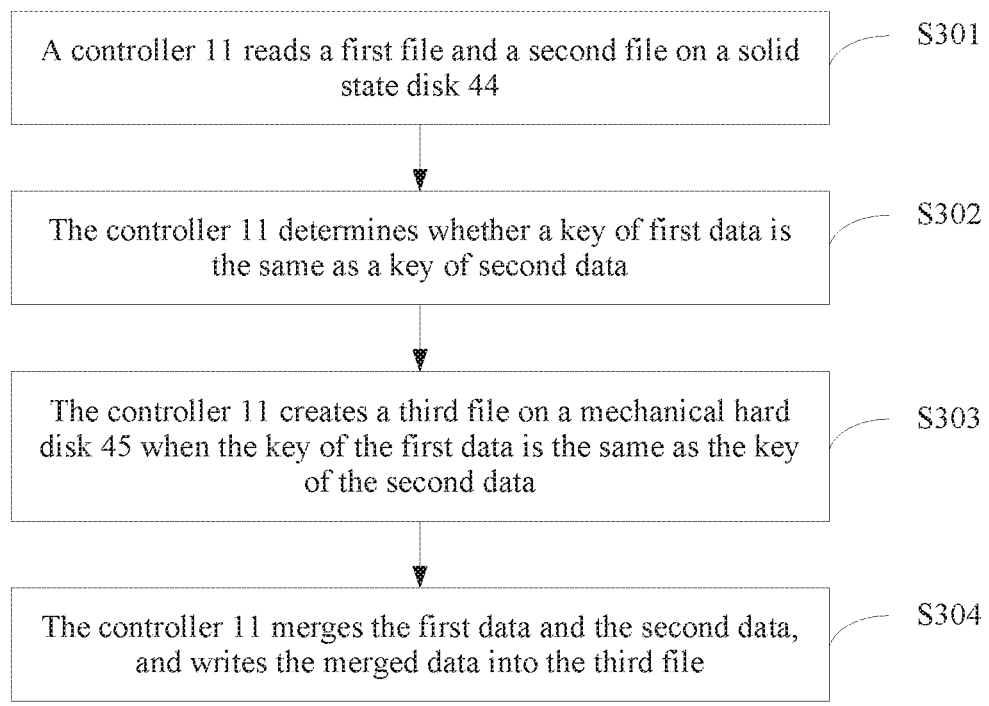
FIG. 4 is a flowchart of a file merging method according to an embodiment of the present disclosure.

A file merging method disclosed in an embodiment of the present disclosure is described below with reference to the storage system shown in FIG. 1 and the structure of the controller 11 shown in FIG. 2. FIG. 4 is a flowchart of a file merging method according to an embodiment of the present disclosure. As shown in FIG. 4, the data merging method is performed by the processor 112 in the controller 11, and includes the following steps.

Step S301. The controller 11 reads a first file and a second file on the solid state disk 44.

In one case, both data in the first file and data in the second file are from the memory 111 of the controller 11. Further, the first file is generated due to dumping of one immutable memtable in the memory 111, and the second file is generated due to dumping of another immutable memtable in the memory 111. Because data in the immutable memtable is sorted in ascending or descending order of keys, the data in the first file and the data in the second file are also sorted based on keys. This can improve data reading efficiency.

In another case, both data in the first file and data in the second file are obtained by playing back a log file. The log file stores a plurality of data writing instructions, and information such as an operation type or a global sequence number. Therefore, the data in the first file and the data in the second file may be generated by playing back the log file. A size of each file is preset, and may be the same as a size of an immutable memtable, or may be different from a size of an immutable memtable. In this case, the log file is usually stored in a storage class memory, to more quickly obtain data from the log file.

Regardless of whether the data in the first file and the data in the second file are from the memory 111 or from the log file, after the data in the first file and the data in the second file are persistently stored in the solid state disk 44, corresponding content in the log file may be deleted, to reduce storage space occupied by the log file.

That the controller 11 reads the first file is used as an example. The controller 11 queries, based on an identifier of the first file, a correspondence between an identifier of a file and a logical address of data included in the file, to obtain a logical address of the data (for example, first data) included in the first file. The controller 11 sends the logical address to the solid state disk 44. The solid state disk 44 obtains, based on a correspondence between the logical address and a physical address, data from the physical address corresponding to the logical address, and sends the data to the controller 11. Similarly, the controller 11 also reads the second file in such a manner.

For ease of description, in this embodiment, the first file includes the first data and a key of the first data, and the second file includes second data and a key of the second data.

Step S302. The controller 11 determines whether a key of first data is the same as a key of second data.

A key of data is used to identify the data. Whether the key of the first data is the same as the key of the second data is determined to determine whether the first file and the second file need to be merged.

Step S303. The controller 11 creates a third file on the mechanical hard disk 45 when the key of the first data is the same as the key of the second data.

If the key of the first data is the same as the key of the second data, it indicates that the first file and the second file need to be merged. A file after merging is the third file. Because data in the file after merging is old data, and is less likely to be read than that in the first file and the second file, to reduce costs, the controller 11 writes the merged data into the mechanical hard disk 45. Further, the controller 11 creates the third file, allocates an identifier to the third file, and allocates a logical address range to the third file. The logical address range corresponds to a physical address range of the mechanical hard disk 45. The controller 11 stores a correspondence between an identifier of the third file and the logical address range, and a correspondence between the logical address range and the physical address range.

Step S304. The controller 11 merges the first data and the second data, and writes the merged data into the third file.

Further, the controller 11 writes the merged data into the physical address range corresponding to the allocated logical address range.

If the key of the first data is different from the key of the second data, the first file and the second file do not need to be merged. Then the controller 11 creates the third file on the mechanical hard disk 45, and separately writes, into the third file, the data included in the first file and the data included in the second file. A specific process of writing the data into the third file is the same as a process of writing the merged data into the third file. Details are not described herein again.

According to the file merging method provided in this embodiment of the present disclosure, a file before merging is stored in the solid state disk, and a file after merging is stored in the mechanical hard disk. Data in the file before merging is new data, and therefore is more likely to be read. Data reading efficiency can be improved by storing the file before merging in the solid state disk. Data in the file after merging is old data, and therefore is less likely to be read. Costs can be reduced by storing the file after merging in the mechanical hard disk.

In the embodiments provided, it should be understood that the disclosed system, device, and method may be implemented in other manners. For example, the described apparatus embodiment is merely an example. For example, the module division is merely logical function division and may be other division in implementation. For example, a plurality of modules or components may be combined or integrated into another system, or some features may be ignored or not performed. In addition, the displayed or discussed mutual couplings or direct couplings or communication connections may be implemented using some interfaces. The indirect couplings or communication connections between the apparatuses or modules may be implemented in an electronic form, a mechanical form, or another form.

The modules described as separate parts may or may not be physically separate, and parts displayed as modules may or may not be physical modules, that is, may be located in one position, or may be distributed on a plurality of network modules. Some or all of the modules may be selected based on actual needs to achieve the objectives of the solutions of the embodiments.

In addition, function modules in the embodiments of the present disclosure may be integrated into one processing module, or each of the modules may exist alone physically, or two or more modules may be integrated into one module. The integrated module may be implemented in a form of hardware, or may be implemented in a form of hardware in addition to a software function module.

When the foregoing integrated module is implemented in a form of a software function module, the integrated unit may be stored in a computer-readable storage medium. The software function module is stored in a storage medium and includes instructions for instructing a computer device (which may be a personal computer, a server, a network device, or the like) to perform some of the steps of the methods described in the embodiments of the present disclosure. The foregoing storage medium includes any medium that can store program code, such as a removable hard disk, a read-only memory, a random access memory, a magnetic disk, or an optical disc.

What is claimed is:

1. A file merging method applied to a storage system and implemented by a controller, wherein the storage system comprises the controller, a solid state disk, and a mechanical hard disk, and wherein the file merging method comprises:
reading a first file and a second file on the solid state disk, wherein the first file is configured to store first data and a first key of the first data, and wherein the second file is configured to store second data and a second key of the second data;
determining whether the first key is the same as the second key;
creating a third file on the mechanical hard disk when the first key is the same as the second key;
merging the first data and the second data to obtain merged data; and
writing the merged data into the third file,
wherein a cache of the controller is configured to store at least two immutable memtables and one memtable, wherein the first data is from a first immutable memtable of the at least two immutable memtables, wherein the second data is from a second immutable memtable of the at least two immutable memtables, and wherein the at least two immutable memtables and the one memtable are configured to receive data from a host.

2. The file merging method of claim 1, further comprising:
monitoring whether a quantity of files on the solid state disk reaches a preset threshold; and
reading the first file and the second file on the solid state disk when the quantity of files on the solid state disk reaches the preset threshold.

3. The file merging method of claim 1, further comprising storing, by a storage class memory of the storage system, a log file, wherein the file merging method further comprises:
receiving a first data writing instruction from the host;
writing the first data writing instruction into the log file, wherein the first data writing instruction comprises the first data and the first key;
receiving a second data writing instruction from the host;
writing the second data writing instruction into the log file, wherein the second data writing instruction comprises the second data and the second key;
playing back the log file to obtain the first data, the first key, the second data, and the second key;
creating the first file on the solid state disk;
writing the first data and the first key into the first file;
creating the second file on the solid state disk; and
writing the second data and the second key into the second file.

4. The file merging method of claim 3, wherein writing the first data writing instruction into the log file comprises writing the first data writing instruction into the log file through appending.

5. The file merging method of claim 3, wherein the log file further comprises an additional data writing instruction, and wherein the file merging method further comprises sorting all data writing instructions in the log file based on a key included in each data writing instruction.

6. A controller in a storage system, the controller comprising:
a communications interface configured to communicate with a solid state disk and a mechanical hard disk of the storage system;
a processor coupled to the communications interface and configured to:
read, using the communications interface, a first file and a second file on the solid state disk, wherein the first file is configured to store first data and a first key of the first data, and wherein the second file is configured to store second data and a second key of the second data;
determine whether the first key is the same as the second key;
create a third file on the mechanical hard disk when the first key is the same as the second key;
merge the first data and the second data to obtain merged data; and
write, using the communications interface, the merged data into the third file; and
a cache configured to store at least two immutable memtables and one memtable, wherein the first data is from a first immutable memtable of the at least two immutable memtables, wherein the second data is from a second immutable memtable of the at least two immutable memtables, and wherein the at least two immutable memtables and the one memtable are configured to receive data from a host.

7. The controller of claim 6, wherein the processor is further configured to:
monitor whether a quantity of files on the solid state disk reaches a preset threshold; and
read, using the communications interface, the first file and the second file on the solid state disk when the quantity of files on the solid state disk reaches the preset threshold.

8. The controller of claim 6, wherein the storage system further comprises a storage class memory, wherein the storage class memory is configured to store a log file, and wherein the processor is further configured to:
receive, using the communications interface, a first data writing instruction from the host;
write, using the communications interface, the first data writing instruction into the log file, wherein the first data writing instruction comprises the first data and the first key;
receive, using the communications interface, a second data writing instruction from the host;
write, using the communications interface, the second data writing instruction into the log file, wherein the second data writing instruction comprises the second data and the second key;
play back the log file to obtain the first data, the first key, the second data, and the second key;
create the first file on the solid state disk;
write, using the communications interface, the first data and the first key into the first file;
create the second file on the solid state disk; and
write the second data and the second key into the second file.

9. The controller of claim 8, wherein when writing the first data writing instruction into the log file, the processor is further configured to write, using the communications interface, the first data writing instruction into the log file through appending.

10. The controller of claim 8, wherein the log file further comprises an additional data writing instruction, and wherein the processor is further configured to sort all data writing instructions in the log file based on a key included in each data writing instruction.

11. The controller of claim 8, wherein the host is coupled to the controller using a storage area network (SAN).

12. The controller of claim 8, wherein the storage system is a key-value (KV) storage system, and wherein data storage in the storage system is implemented using a log-structured merge-tree (LSM-Tree).

13. A computer program product comprising computer-executable instructions for storage on a non-volatile computer readable storage medium that, when executed by a controller in a storage system, cause the controller to:
    read a first file and a second file on a solid state disk in the storage system, wherein the first file is configured to store first data and a first key of the first data, and wherein the second file is configured to store second data and a second key of the second data;
    determine whether the first key is the same as the second key;
    create a third file on a mechanical hard disk when the first key is the same as the second key;
    merge the first data and the second data to obtain merged data; and
    write the merged data into the third file,
    wherein a cache of the controller is configured to store at least two immutable memtables and one memtable, wherein the first data is from a first immutable memtable of the at least two immutable memtables, wherein the second data is from a second immutable memtable of the at least two immutable memtables, and wherein the at least two immutable memtables and the one memtable are configured to receive data from a host.

14. The computer program product of claim 13, wherein the computer-executable instructions further cause the controller to:
    monitor whether a quantity of files on the solid state disk reaches a preset threshold; and
    read the first file and the second file on the solid state disk when the quantity of files on the solid state disk reaches the preset threshold.

15. The computer program product of claim 13, wherein the storage system further comprises a storage class memory, wherein the storage class memory is further configured to store a log file, and wherein the computer-executable instructions further cause the controller to:
    receive a first data writing instruction from the host;
    write the first data writing instruction into the log file, wherein the first data writing instruction comprises the first data and the first key;
    receive a second data writing instruction from the host;
    write the second data writing instruction into the log file, wherein the second data writing instruction comprises the second data and the second key;
    play back the log file to obtain the first data, the first key, the second data, and the second key;
    create the first file on the solid state disk;
    write the first data and the first key into the first file;
    create the second file on the solid state disk; and
    write the second data and the second key into the second file.

16. The computer program product of claim 13, wherein the first file is a first sorted string table (SST) file, and wherein the second file is a second SST file.

17. The computer program product of claim 15, wherein when writing the first data writing instruction into the log file, the computer-executable instructions further cause the controller to write the first data writing instruction into the log file through appending.

18. The computer program product of claim 15 wherein the log file further comprises an additional data writing instruction, and wherein the computer-executable instructions further cause the controller to sort all data writing instructions in the log file based on a key included in each data writing instruction.

19. The file merging method of claim 1, wherein the first file is a first sorted string table (SST) file, and wherein the second file is a second SST file.

20. The file merging method of claim 1, wherein the host is coupled to the controller using a storage area network (SAN).

* * * * *